US007168550B2

(12) United States Patent
Schröder

(10) Patent No.: US 7,168,550 B2
(45) Date of Patent: Jan. 30, 2007

(54) METHOD AND DEVICE FOR DELIVERING BOOKS IN THE LYING-FLAT CONDITION

(75) Inventor: Karl-Friedrich Schröder, Espelkamp (DE)

(73) Assignee: Kolbus GmbH & Co. KG, Rahden (DE)

( * ) Notice: Subject to any disclaimer, the term of this patent is extended or adjusted under 35 U.S.C. 154(b) by 370 days.

(21) Appl. No.: 10/887,506

(22) Filed: Jul. 7, 2004

(65) Prior Publication Data

US 2005/0034265 A1 Feb. 17, 2005

(30) Foreign Application Priority Data

Jul. 24, 2003 (DE) ................................ 103 33 587
Feb. 7, 2004 (DE) ...................... 10 2004 006 128

(51) Int. Cl.
*B65G 17/32* (2006.01)

(52) U.S. Cl. ............... 198/377.03; 198/412; 198/460.2

(58) Field of Classification Search ................ 198/373, 198/375, 377.03, 377.07, 400, 412, 460.2, 198/461.1

See application file for complete search history.

(56) References Cited

U.S. PATENT DOCUMENTS 3,362,521 A * 1/1968 Thorp ........................ 198/412
3,747,739 A * 7/1973 Fuchs et al. ............. 198/419.1
3,860,104 A * 1/1975 Strauss .................... 198/459.3
4,208,761 A * 6/1980 Ionescu ........................ 15/304
4,471,955 A * 9/1984 Bradley et al. ............. 271/203
4,534,153 A * 8/1985 Nowicki ....................... 53/448
4,596,161 A * 6/1986 Vigano' ....................... 74/109
4,619,357 A * 10/1986 Radzins et al. ............. 198/412
4,844,233 A * 7/1989 Aidlin et al. ............... 198/394
5,261,520 A * 11/1993 Duke ......................... 198/375
5,417,037 A * 5/1995 Osti et al. ...................... 53/446

(Continued)

FOREIGN PATENT DOCUMENTS

DE 26 52 544 A1 6/1977

(Continued)

*Primary Examiner*—Joe Dillon, Jr.
(74) *Attorney, Agent, or Firm*—Alix, Yale & Ristas, LLP

(57) ABSTRACT

For the purpose of delivering, in the lying-flat condition, book blocks or books which are fed in, standing on their back or on the front cut and at defined timing intervals along their height, from a preceding machine in a transport path, provision is made, according to the method, for the books to be picked up, in accordance with the timing, in the transport path, swung out transversely to the direction of infeed and transferred into a defined delivery position which is spaced apart from the transport path, and is essentially a lying-flat position and from which said books can be fed to subsequent machines synchronously with the timing. The device for performing the method includes a continuously driven clamping conveyer consisting of traction means conveyers which act counter to one another and clamp the books in between them and convey them as far as the picking-up position, a transporting band which still carries the books even in the picking-up position, at least one gripper which clamps the books in the picking-up position and, after the picking-up operation, swings them into the delivery position spaced apart from the transport path and deposits the said books at that point, and a belt conveyer which feeds the books out of said delivery position.

9 Claims, 3 Drawing Sheets

U.S. PATENT DOCUMENTS

| | | | | | |
|---|---|---|---|---|---|
| 5,450,940 | A | * | 9/1995 | Rathert et al. | 198/412 |
| 5,469,954 | A | * | 11/1995 | Rathert et al. | 198/412 |
| 5,641,053 | A | * | 6/1997 | Nannini et al. | 198/461.3 |
| 6,062,845 | A | * | 5/2000 | Conaway et al. | 425/444 |
| 6,527,100 | B2 | * | 3/2003 | Ballestrazzi et al. | 198/373 |
| 6,644,461 | B1 | * | 11/2003 | Imbert et al. | 198/419.2 |

FOREIGN PATENT DOCUMENTS

| | | | |
|---|---|---|---|
| DE | 42 36 362 | A1 | 5/1994 |
| DE | 195 00 560 | A1 | 7/1996 |
| DE | 100 45 400 | A1 | 3/2002 |
| DE | 100 45 801 | A1 | 3/2002 |

* cited by examiner

METHOD AND DEVICE FOR DELIVERING BOOKS IN THE LYING-FLAT CONDITION

BACKGROUND OF THE INVENTION

The present invention relates to a method and device for delivering, in the lying-flat condition, book blocks or books which are fed in, standing on their back or on the front cut and at defined timing intervals along their height, from a preceding machine in a transport path.

In bookbinding, during final processing the book block is united with the book cover to form the book (book-casing-in machine) and is subjected to final shaping (fold-burning-in and pressing machine). The finished book is then completed, depending upon the get-up of the books, with various additional elements, such as, for example, a protective jacket (protective-jacket wrapping machine) and supplements (slipping-in machine). For further processing, for example packing and/or pelletizing, the books are usually arranged one above another in layers to form stacks of books. In industrial bookbinding, the individual machines necessary for these purposes are often coupled to one another to form production sections, emergency delivery apparatuses being provided at suitable points in the production section in order to maintain operating capability. In many cases, these emergency delivery apparatuses are coupled to book-stacking apparatuses in order, on the one hand, to permit orderly emergency delivery and, on the other, to feed books which have already been given their desired get-up by the time of this delivery, out of the production section and into stacks of books in a regular manner.

In known book-stacking apparatuses, the books are fed, in the lying-flat condition, to a lifting apparatus which operates in a timed manner and which lifts the books into a stacking shaft. In this operation, a newly fed-in book is raised under the stack of books which has hitherto been formed, while blocking pawls, which protrude laterally into the stacking shaft and can be disengaged, prevent the stack which has been formed from dropping back down. Rotating apparatuses are mostly disposed upstream of the book-stacking apparatuses for selectively rotating, by 180°, the books that have been fed in a timed manner, which makes possible book-stacking patterns with books which lie one above the other with the front cut and the back alternately.

In the known fold-burning-in and pressing machines, the books are moved forwards intermittently, along their back and standing on the latter, the said books being transported onwards with transporting tongs which are moved forward and back and which engage in the folds of the books; whereas, when the backward movement of the transporting tongs occurs, the books are clamped in between pressing plates that act on the sides of the book over the entire surface area thereof. The books are thus transported in a timed manner. In the feeding-out system of the fold-burning-in and pressing machine, the books are picked up laterally by a clamping gripper which is moved in the opposite direction to the transporting tongs, and are transferred into a delivering position. If the fold-burning-in and pressing machine forms the end of a production section, the books are deposited, in the delivery position, onto a transporting band at the side with an ejector rake. An alternative variant for the feeding-out system is intended for coupling to the protective-jacket wrapping machine, through the fact that the books pass, in the delivery position, onto a continuously driven feeding-out band which conveys them onwards by frictional-contact entrainment.

In the protective-jacket wrapping machine, continuous conveying of the books, which continue to stand on their backs, is brought about, fixed timing intervals being realized through the fact that the books are conveyed resting, with their head or foot side, against entrainment means belonging to the transporting band carrying said books, which entrainment means are disposed at equal mutual intervals from one another. Here too, the books are transported forwards in a timed manner as a result of fixed timing intervals, so that pre-arranged cyclic feeding is necessary. In the feeding-out system of the protective-jacket wrapping machine, the books are conveyed against a stop and deposited onto a transporting band at the side. In a similar manner, the books are also delivered, in the lying-flat condition, in the emergency delivery apparatus which is sometimes disposed between the fold-burning-in and pressing machine and the protective-jacket wrapping machine.

After each delivery of the books in the lying-flat condition, said books are transported onwards by frictional contact connection on the transporting bands, which are preferably disposed transversely to the original direction of conveyance, with the back or the front cut foremost, and are optionally fed to book-stacking apparatuses. The timed conveying operation still existing in the preceding machines (fold-burning-in and pressing machine, emergency delivery apparatus, protective-jacket wrapping machine) is lost in the aforesaid delivery apparatuses and has to be brought about again, with a comparatively high technical outlay (on components and a control system), in the infeed system of the book-stacking apparatuses connected downstream. Another disadvantage is the deposition and onward conveyance, which are somewhat damaging to the product, of the books which have just been cased in, shaped and, optionally, further got up.

SUMMARY OF THE INVENTION

The underlying object of the present invention is to provide a method for delivering, in the lying-flat condition, book blocks or books which are fed in, standing on their back or on the front cut and at defined timing intervals along their height, from a preceding machine in a transport path, and a device for performing said method, which make it possible to deliver the books from the preceding machines in a manner which is careful to the product and while maintaining the cycling.

The concept of the invention lies in maintaining the timed conveyance during delivery and transferring the books into a defined delivery position which is spaced apart from the transport path and is essentially a lying-flat position. For that purpose, the books are picked up in accordance with the timing and swung out transversely to the direction of infeed conveyance. The books can be fed to subsequent machines, such as a book-stacking apparatus for example, without cyclic feeding having to be carried out again. The structural space required is reduced enormously and the investment costs, which are determined to a considerable extent by the technical outlay on components and the control system, are minimized.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

Figure 1:
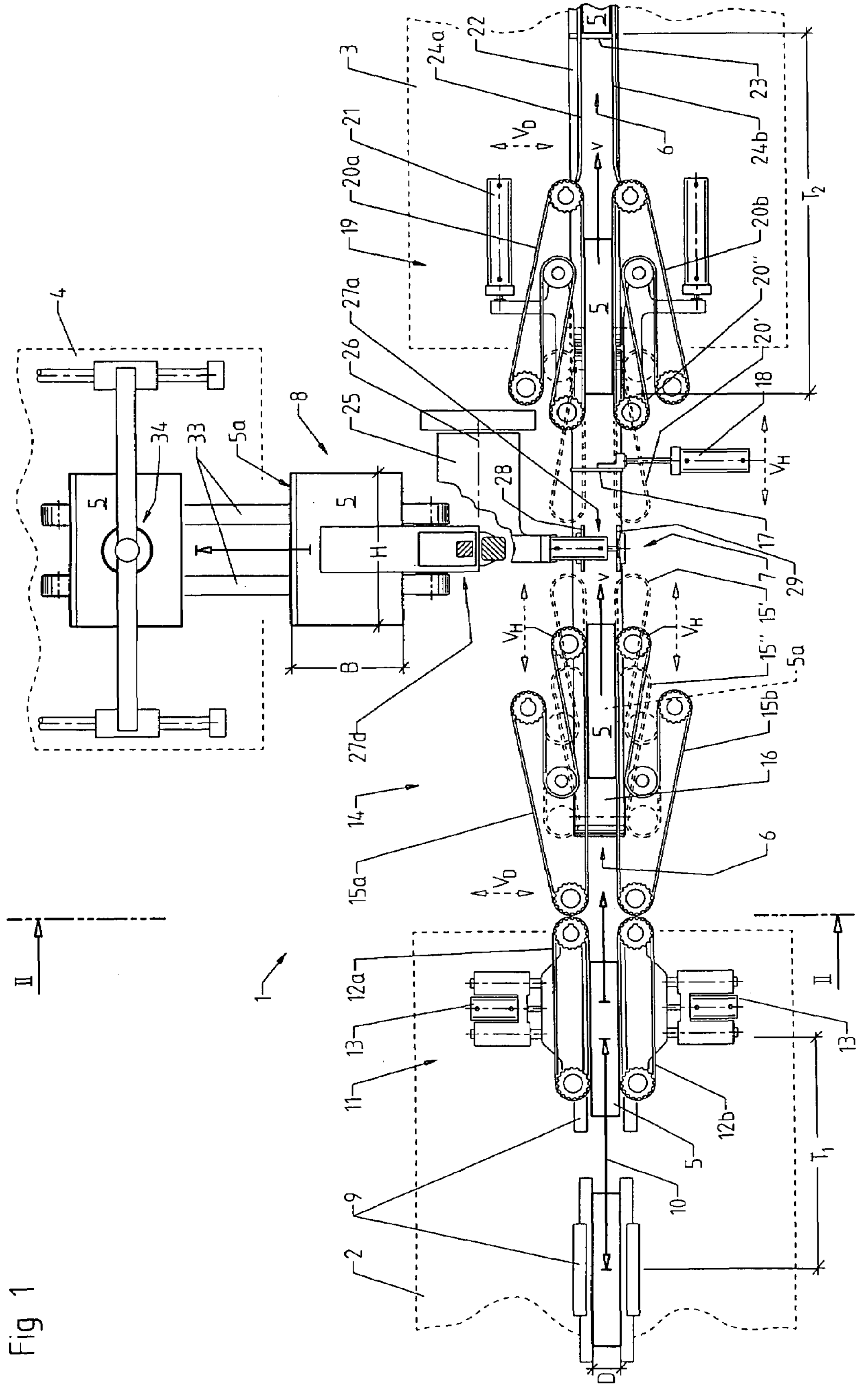
FIG. 1 is a plan view of a device for delivering and discharging books, in the lying-flat condition, from a fold-burning-in and pressing machine.

Represented in FIG. 1 is a first exemplified embodiment of a delivering device 1 according to the invention for books 5, namely for use downstream of a fold-burning-in and pressing machine 2 which is outlined in broken lines in FIG. 1, it being possible to feed the books 5 selectively to a protective-jacket wrapping machine 3, which is likewise outlined in broken lines, or to a book-stacking apparatus 4, with said delivering device 1. In the fold-burning-in and pressing machine 2, the books 5 are moved forwards intermittently, in the course of their processing in a transport path 6, along their back 5*a* and standing on the latter, the timed transporting operation taking place with transporting tongs 9 which engage in the fold of the books 5 and execute a forward-and-back movement 10 over the timing interval $T_1$.

The books 5 are passed over by the transporting tongs 9 in a stationary condition to an accelerating conveyer 11, through the fact that toothed conveyer belts 12*a, b* belonging to said accelerating conveyer 11 clamp said books 5 in laterally and then accelerate them to a speed of conveyance v, at which the said books 5 are then passed over to a continuously driven clamping conveyer 14. For the purpose of opening and closing the accelerating conveyer 11, the toothed conveyer belts 12*a, b* are actuated by pneumatic cylinders 13 with associated guide units.

The clamping conveyer 14 is formed from two specularly symmetrical, telescopically adjustable toothed conveyer belts 15*a, b* which revolve at the constant speed of conveyance v and which, clamping the books 5 in laterally in the transport path 6, transport them onwards right into a picking-up position 7 defined by a barrier 17, the onward transport being assisted by a transporting band 16 which is driven at the same speed of conveyance v and on which the books 5 are supported by their back 5*a*. The barrier 17 and the telescopically adjustable toothed conveyer belts 15*a, b* can be set to the format height H of the books 5 in such a way that the latter each come to a standstill centrally in the picking-up position 7. In FIG. 1, the toothed conveyer belts 15*a, b* are outlined in broken lines in the position 15' for a small format height H, and in the position 15" for a large format height H.

Figure 2:
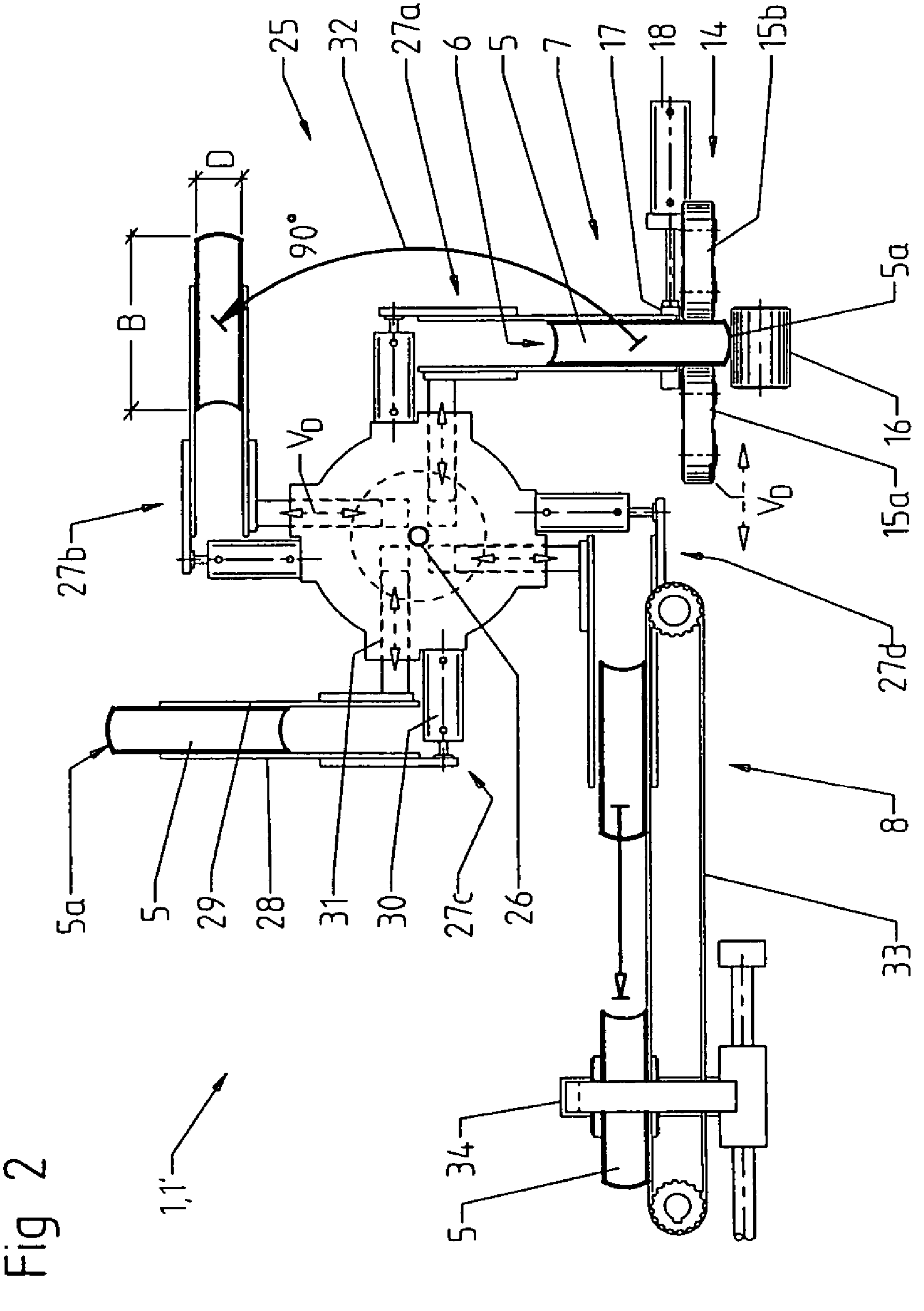
FIG. 2 is a side view taken along line II—II of FIG. 1.

After reaching the picking-up position 7, the books 5 are picked up by a gripper 27*a* by lateral clamping-in with clamping plates 28, 29, and are swung out of the transport path 6 with a rotating apparatus 25. Said rotating apparatus 25 comprises a total of four grippers 27*a* to *d* disposed at equal mutual angles from one another, and accordingly executes a revolution 32 which is intermittent within the 90° timing, as can be seen in FIG. 2. After each 90° rotation, the next gripper is ready to pick up a book 5, while the remaining grippers are fed, in additional 90° rotational steps, to a delivery position 8 for the books 5. Said delivery position 8 is reached in three 90° rotations after the picking-up position 7. In the delivery position 8, the books 5 are orientated in the lying-flat condition and are deposited, after the opening of the grippers 27*a* to *d*, onto a belt conveyer 33 which is of at least two-track construction and which is stationary when deposition occurs and then, in order to convey the books out, is set in motion for the purpose of transferring the books 5, in a manner which is accurate in terms of timing and position, into the rotating apparatus 34 belonging to the book-stacking apparatus 4, of which no further details are represented. With the delivering device 1 according to the invention it is possible to dispense with complicated cyclic feeding, such as has hitherto been necessary for book-stacking apparatuses.

As can be seen from FIG. 2, the axis of rotation 26 of the direction of rotation 25 is located laterally above the transporting band 16. The direction of rotation of the intermittent revolution 32 is designed in such a way that the books 5 are initially swung, with the grippers 27*a* to *d*, upwards out of the transport path 6 towards the opposite side in order to then be deposited, in the intermittent three-quarter revolution across said transport path 6, on the belt conveyer 33 which is disposed on the same side as the axis of rotation 26 and forms the delivery position 8. The books are held continuously by the grippers 27*a* to *d* during the swinging operation. This guarantees handling which is particularly careful to the product. The make-up of the grippers 27*a* to *d* is such that an inner clamping plate 29 is designed to be capable of being set to the format thickness D and an outer clamping plate 28 is designed to be capable of being actuated by a pneumatic cylinder 30 for the purpose of clamping-in the books 5. Those clamping plates 29 of the grippers 27*a* to *d* which are the inner ones in each case and are guided in linear guides 31, are associated with a central adjustment $V_D$, of which no further details are represented, in the rotating apparatus 25.

As already stated above, the delivering device 1 in FIG. 1 serves for the selective onward conveyance of the books 5 to the book-stacking apparatus 4 or to the protective-jacket wrapping machine 3, infeed to said book-stacking apparatus 4 taking place by said books being picked up in accordance with the timing and swung out of the transport path 6 and being deposited in the delivery position 8 in the lying-flat condition. The onward conveyance of the books 5 in the transport path 6 for the purpose of feeding them, synchronously with the timing, into the protective-jacket wrapping machine 3, can be seen from FIG. 1. The barrier 17 can be moved out of the transport path 6 in a manner actuated by a pneumatic cylinder 18, so that said transport path 6 is unblocked for the running-through of the books 5. Further on in the course of the transport path 6, there is provided a second clamping conveyer 19 which is formed from telescopic toothed conveyer belts 20*a, b* and can be steered into two positions by pneumatic cylinders 21. A first position 20' is intended for the running-through of the books 5. In this case, the toothed conveyer belts 20*a, b* reach right up to the clamping plates 28, 29 of the grippers 27*a* to *d* and pick up the books 5 while they are still being conveyed, in a clamped-in manner, in the first clamping conveyer 14. With the positive passing-over operation, timed transport is guaranteed.

The clamping conveyer 19 conveys the books 5 as far as a (feeding-in) transporting band 22 equipped with lateral guides 24*a, b* and belonging to the protective-jacket wrapping machine 3, the passing-over of the books 5 taking place through the fact that entrainment means 23, which are mounted on the transporting band 22 at fixed timing intervals $T_2$ entrain the books 5 at their head or foot side which lies at the rear. It should be observed that the entire system is coordinated in such a way that the books 5 are transported in the delivering device 1 at the same speed of conveyance v as that at which they are also processed, in continuous conveyance, in the protective-jacket wrapping machine 3.

With this in-line coupling of the fold-burning-in and pressing machine 2 and the protective-jacket wrapping machine 3, an additional timing-coordinating device, such as is otherwise customary, is no longer necessary.

A second position 20" of the clamping conveyer 19 is defined for the discharge of the books 5 from the transport path for the above described feeding of said books 5 to the book-stacking apparatus 4. The toothed conveyer belts 20*a, b* are retracted to an extent such that even the books 5 having the largest format height H are exposed, in the picking-up position 7, for swinging out of the transport path 6. The two positions 20' and 20" can be activated during operation so that individual books 5 can be discharged from the transport path 6, for example during the in-line processing of books 5.

Figure 3:
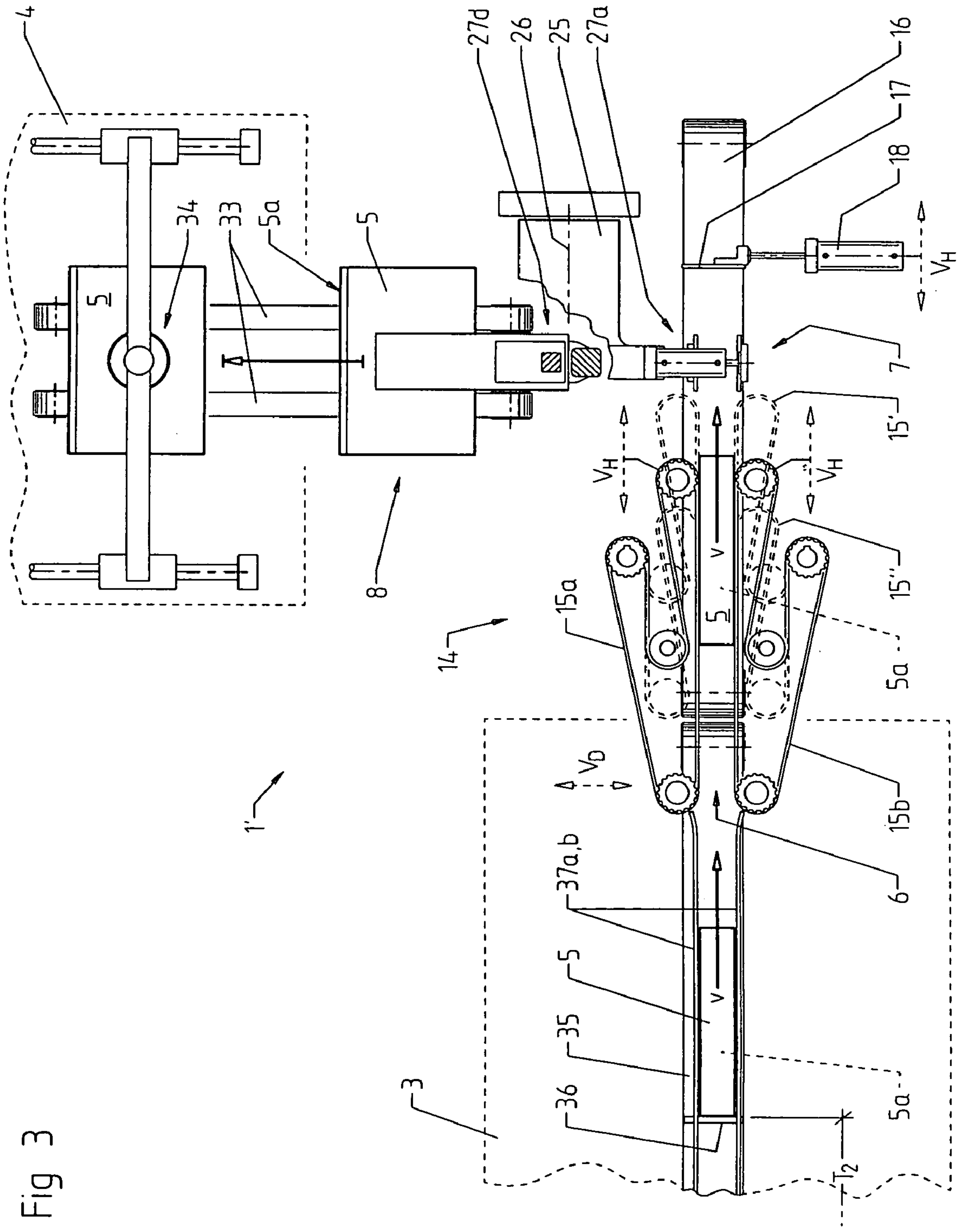
FIG. 3 is a plan view of a device for delivering books, in the lying-flat condition, from a protective-jacket wrapping machine.

A second exemplified embodiment of a delivering device 1' according to the invention is represented in FIG. 3. The delivering device 1' is identical, in its essential constituent parts, to the first embodiment of the delivering device 1 and serves for delivering books 5 from the protective-jacket wrapping machine 3 which feeds said books 5 at timing intervals $T_2$, supported on a transporting band 35 by the back 5*a*, resting against entrainment means 36 and guided between guides 37*a, b,* to the delivering device 1' at the constant speed of conveyance v. The accelerating conveyer 11 is not necessary. The books are taken over by the described clamping conveyer 14 and conveyed, with the aid of the transporting band 16, right into the picking-up position 7 defined by the barrier 17, for the purpose of picking-up and swinging-out the books 5 with the grippers 27*a* to *d* disposed in the rotating apparatus 25 and for the purpose of depositing said books 5 in the delivery position 8 on the belt conveyer 33. In this case, the delivering device 1' forms, as it were, the termination of the protective-jacket wrapping machine 3. Each book 5 is delivered, via the delivering device 1', into the rotating apparatus 34 of the book-stacking apparatus 4. Nevertheless, further processing in subsequent machines, for example a packing machine, is also conceivable, in which case the transport path 6 may be unblocked by the moving-out of the barrier 17.

In addition to the above described adjustments $V_H$ as regards the format height H of the books 5, adjustments $V_D$ are provided which take account of the format thickness D. The adjustments $V_D$ are operative for the transport path 6 as well as for the grippers 27*a* to *d*. Adjustments as regards the format width B of the books 5 are not necessary.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A device for delivering book blocks or books along a transport path from a preceding machine, the device comprising:

a picking-up position;

a delivery position spaced apart from the transport path;

a continuously driven first clamping conveyer including first and second traction conveyers, the second traction conveyor acting counter to the first tractor conveyor whereby the book blocks or books are clamped between the tractor conveyors and conveyed to the picking-up position;

a transporting band for carrying the book blocks or books into and in the picking-up position;

a gripping device including at least one gripper for clamping the book blocks or books in the picking-up position, picking-up the book blocks or books, swinging the book blocks or books apart from the transport path and depositing the book blocks or books at the delivery position; and a belt conveyer for feeding the book blocks or books out of the delivery position.

2. The device of claim 1 wherein the stationary picking-up position is defined by a barrier in the transport path.

3. The device of claim 1 wherein the gripping device includes a plurality of grippers disposed in a rotating apparatus, the rotating apparatus revolving in an intermittent manner.

4. The device of claim 3 wherein the rotating apparatus has an axis of rotation, the rotating apparatus axis and the belt conveyor being disposed laterally above the transporting band, the belt conveyor defining the delivery position, the rotating apparatus having a direction of rotation whereby the book blocks or books are initially swung in an approximately three-quarter revolution across said transport path to be deposited on the belt conveyer.

5. The device of claim 1 further comprising an accelerating conveyer disposed upstream of the first clamping conveyer, for taking over book blocks or books delivered in a stationary condition from the preceding machine.

6. The device of claim 1 wherein the first clamping conveyer is telescopically adjustable as regards the format height, so that the books can be conveyed, with a constant center, into the picking-up position.

7. The device of claim 1 further comprising a second clamping conveyer disposed downstream of the first clamping conveyer, the second clamping conveyer having an intake proximate to the picking-up position, the intake of the second clamping conveyer unblocking the picking-up position in a telescopically backing-up manner for discharging books from the picking-up position.

8. The device of claim 1 wherein the belt conveyer is stationary when the book blocks or books are deposited and performs a defined conveying stroke for the purpose of passing the book blocks or books over into a subsequent machine in a manner which is accurate in terms of timing and position.

9. The device of claim 8, wherein the subsequent machine is a book-stacking apparatus.

* * * * *